United States Patent [19]
Wilkinson

[11] Patent Number: 4,751,604
[45] Date of Patent: Jun. 14, 1988

[54] COMPARISON SIGNAL ERROR DETECTOR FOR PROTECTIVE RELAY SYSTEM

[75] Inventor: Stanley B. Wilkinson, Havertown, Pa.

[73] Assignee: General Electric Company, King of Prussia, Pa.

[21] Appl. No.: 920,306

[22] Filed: Oct. 16, 1986

[51] Int. Cl.[4] .................. H02H 3/03; H02H 7/26
[52] U.S. Cl. .................................. 361/68; 361/64
[58] Field of Search ............... 361/63, 64, 66–69, 361/86, 89, 81, 94, 97, 110, 111; 307/86, 112

[56] References Cited

U.S. PATENT DOCUMENTS

| | | | |
|---|---|---|---|
| 4,056,838 | 11/1977 | Leib | 361/68 |
| 4,275,429 | 6/1981 | Church et al. | 361/64 |
| 4,408,246 | 10/1983 | Ray | 361/64 |
| 4,420,788 | 12/1983 | Wilkinson et al. | 361/67 X |
| 4,464,697 | 8/1984 | Sun | 361/64 |
| 4,524,446 | 6/1985 | Sun et al. | 371/22 |

OTHER PUBLICATIONS

Paper entitled "Utility Fiber Optic Applications" by Patterson et al., presented to Thirty-Eighth Annual Texas A&M Relay Conference, College Station, Texas, Apr. 22–24, 1985.

*Primary Examiner*—A. D. Pellinen
*Assistant Examiner*—Todd E. DeBoer
*Attorney, Agent, or Firm*—Henry J. Policinski; William H. Murray

[57] ABSTRACT

A protective relay, for use in protecting a predetermined protected zone of a three phase alternating current electrical power transmission line, the relay being of the type which receives a comparison signal from a remote relay by way of a communication channel, includes circuitry for detecting abnormalities in the received comparison signal. Such abnormalities are caused by, for example, errors in the communication channel, non-fundamental frequency components in the secondary current caused by current transformer saturation, and high frequency transients in the protected zone. The abnormalities are detected by subtracting a filtered demodulated signal having a frequency which is substantially equal to a fundamental frequency of the comparison signal, from an unfiltered demodulated signal. The resulting difference is a signal which comprises components caused by the abnormalities. The resulting difference signal is utilized as a restraint signal to prevent the protective relay from incorrectly generating a circuit breaker trip signal. The filtered demodulated signal is utilized as an operate signal, in conjunction with a locally generated operate signal, to produce circuit breaker trip signals.

3 Claims, 2 Drawing Sheets

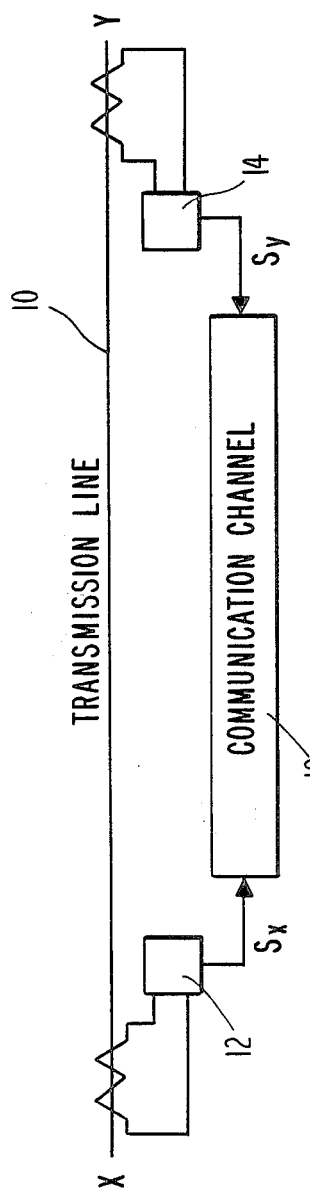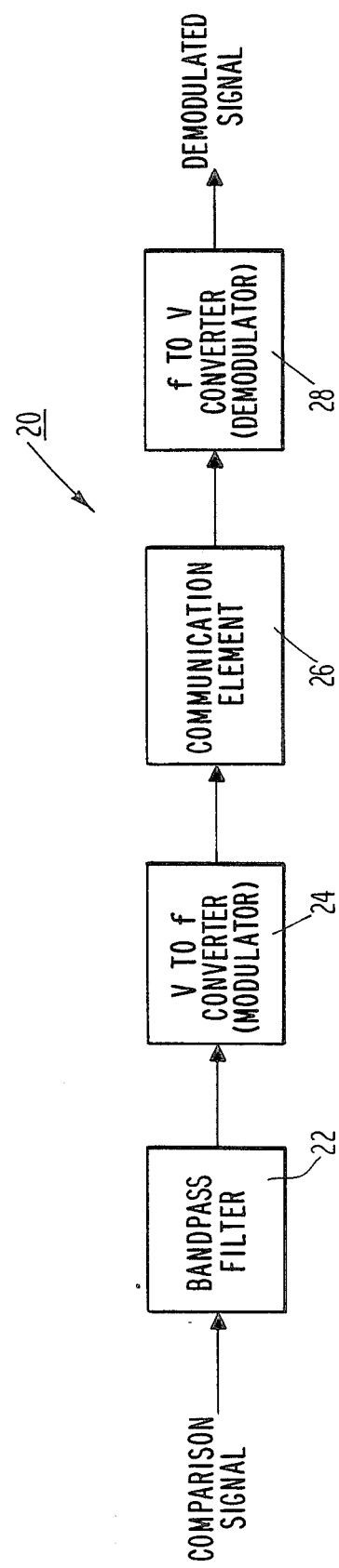

COMPARISON SIGNAL ERROR DETECTOR FOR PROTECTIVE RELAY SYSTEM

BACKGROUND OF THE INVENTION

The present invention relates to protective relay systems for use in protecting AC power distribution systems and more particularly to protective relay systems utilizing a communication channel for transmission of comparison signals between protective relays.

Relays are utilized in protective systems for AC power transmission lines to detect faults occurring within a designated portion, or protected zone, of an AC power transmission line. If such a fault is detected within the protected zone of a transmission line, the relay may generate a signal to operate circuit breakers in order to electrically isolate the protected zone from the rest of the power distribution system.

Zoned protection can be implemented by using a pilot relaying scheme. Such a scheme employs a communication channel in conjunction with protective relays in order to ascertain whether a fault is within the protected line or external to it. The protective relays are typically utilized in pairs, one at each end of the protected zone of the transmission line, which are linked by the communication channel. Such an arrangement is depicted in FIG. 1 which schematically shows a transmission line 10 having a first protective relay 12 at one end X of the protected zone X-Y ; and a second protective relay 14 at the other end Y of the protected zone X-Y of the transmission line 10.

The first relay 12 generates a comparison signal $S_x$ which is transmitted to the second protective relay 14 by means of a communication channel 16. Similiarly, the second protective relay 14 generates a comparison signal $S_y$ which is transmitted to the first protective relay 12 also by means of the communication channel 16. Each protective relay utilizes the received comparison signal in conjunction with a locally generated comparison signal in order to determine whether or not to generate a trip signal which will cause the operation of the circuit breakers.

Ideally, the comparison received signal should be identical to the signal transmitted by the remote relay in order to insure that the protective relaying scheme will operate reliably. One way to accomplish this is to provide an error free communication channel; however, in practice , the communication channel can introduce errors as a result of excessive noise due to, for example, faults in the transmission line, signal frequency translation, alien signals, spurious signals, etc. Errors which affect the received comparison signal can also be caused by saturation of the current transformers used in the relay system which causes non-fundamental frequency sinusoidal components in the secondary current. Errors can also be introduced by the occurrence of internal frequency transients in the protected zone which have a much higher frequency than the fundamental frequency of the system. Such errors could cause the protective relay to generate an erroneous trip signal or conversely to refrain from generating a trip signal upon occurrence of a fault within the protected zone. Therefore, it can be seen that errors attributable to the communication channel linking the protective relays can adversely affect the reliability and security of the protective relaying scheme.

Accordingly, it is an object of the present invention to increase the reliability of protective relaying systems employing a communication channel for transmission of signals between relays.

Another object of the present invention is to enhance the reliability of protective relay operation by minimizing the effect of errors in the communication channel linking the relays.

It is still another object of the present invention to enhance the reliability of protective relay operation in the presence of excessive noise in the communication channel linking the relays.

It is yet another object of the present invention to enhance the security of protective relaying systems when the secondary current exhibits considerable distortion or These and other objects of the present invention will become apparent to those skilled in the art upon consideration of the following description of the invention.

SUMMARY OF THE INVENTION

The present invention comprises an apparatus for detecting channel abnormalities induced by error in a communication channel connecting protective relays in an AC power transmission line protective relaying system. The apparatus comprises a circuit which prevents erroneous operation of the protective relay due to communication channel error. The circuit comprises means for receiving a demodulated comparison signal. The comparison signal, as generated by a remote protective relay, is normally a sinusoidal signal having a predetermined fundamental frequency.

The demodulated signal is coupled to the input of a bandpass filter having a natural frequency at the fundamental frequency and a gain of −1. The output of the bandpass filter, which is a sinusoidal signal at the fundamental frequency, is coupled to one input of a two input of input summing amplifier. The demodulated signal is also coupled to the second input of the two input summing amplifier. Consequently, the output of the bandpass filter is added to the demodulated signal by the two input summing amplifier.

Since the gain of the bandpass filter is −1, the output of the two input summing amplifier will be the difference between the demodulated signal and the sinusoidal signal at the fundamental frequency. Therefore, if the demodulated signal is also a fundamental frequency sinusoid, the inputs to the two input summing amplifier will cancel each other and the output of the amplifier, which is a restraint signal coupled to the protective relay restraint circuit, will be zero.

If there are errors introduced by the communication channel, such errors will almost always produce demodulated signals that are not fundamental frequency sinusoids. Consequently, when the output of the bandpass filter, which is the negative of the fundamental frequency sinusoid, is added to the demodulated signal by the two input summing amplifier, the output of the amplifier will be a signal caused by the errors introduced by the communication channel. Because the output of the two input summing amplifier is applied to the relay restraint circuits, a signal appearing at the output of the amplifier will provide a restraint signal to the relay system in order to prevent an incorrect operation based solely on errors introduced by the communication channel.

Non-fundamental frequency sinusoids may also be introduced in the relay system by current transformer saturation or by natural frequency transients on the power system. Also, if natural frequency transients occurring in the protected zone have a much higher frequency than the fundamental frequency, the shunt capacitance of the line will present a much lower impedence to such transients, and the current flowing in the shunt capacitance would appear as an internal fault to the relay system.

These non-fundamental frequencies are attenuated, but not eliminated, by a signal conditioning circuit (for example, a bandpass filter) at the transmitting end relay; and, as a result, cause the generation of an output by the two input summing amplifier thereby providing desired restraint to minimize the tendency of the relay system to produce an undesired trip.

DETAILED DESCRIPTION OF THE DRAWINGS

While the specification concludes with claims which particularly point out and distinctly claim that which is regarded as the present invention, the objects and advantages of this invention can be more readily ascertained in the following description of the preferred embodiment when read in conjunction with the accompanying drawings in which:

FIG. 1 is a schematic diagram of a protected zone X-Y of an AC power transmission line disposed between two protective relays.

FIG. 2 is a block diagram of an audio frequency communication channel for use in transmitting comparison signals from one protective relay to another.

DETAILED DESCRIPTION OF THE PREFERRED embodiment

Figure 3:
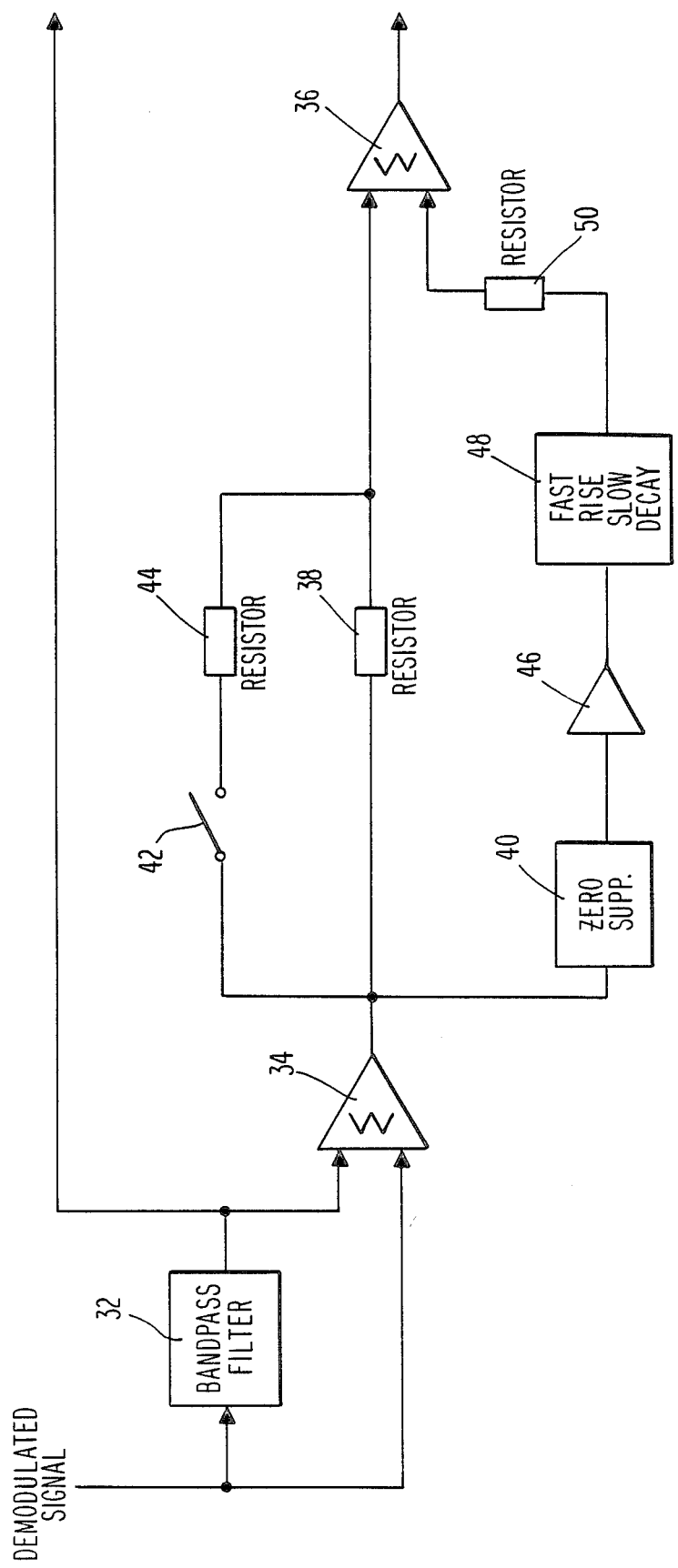
FIG. 3 is a schematic block diagram of a circuit for detecting comparison signal abnormalities induced by errors in the communication channel in accordance with the present invention.

Referring now to FIG. 2, there is shown a block diagram of a communication channel, generally designated 20, utilized to transmit comparison signals from a protective relay at one end of a protected zone of a transmission line to a protective relay at the other end of the protected zone. The comparison signal is coupled to the communication channel 20 through a first bandpass filter 22. In the preferred embodiment, the first bandpass filter 22 is a multiple feedback bandpass filter having a Q of 2 and a natural frequency which is equal to the fundamental frequency of the comparison signal. The fundamental frequency of the comparison signal is typically 50 or 60 Hz.

The communication channel 20 comprises a voltage to frequency converter 24 having an input which is coupled to the output of the first bandpass filter 22. The output of the voltage to frequency converter 24 is a subcarrier signal having a nominal frequency which is frequency modulated by the filtered comparison signal from the first bandpass filter 22. In the preferred embodiment, the nominal frequency of the subcarrier signal is 1800 Hz and the maximum frequency excursion is 1000 Hz. The voltage to frequency converter is preferrably a type VFC32BM manufactured by Burr-Brown Corporation, International Airport Industrial Park, P.O. Box 11400, Tuscon, Ariz., 81734.

The output of the voltage to frequency converter 24 is coupled to the inputs of a communication element 26. The communication element 26 includes the means by which the output signal from the voltage to frequency converter is transmitted from one protective relay to a remote protective relay; for example, a power line carrier, a microwave channel, a fiber optic link, etc.; as well as the interface equipment necessary to adapt the signal output from the voltage to frequency converter 24 to the particular communication element utilized. For purposes of this description, but without limiting the scope of the invention claimed herein, the communication element 26 comprises a voice channel multiplexed onto the power line carrier. In the embodiment described herein, the voice channel is a nominal 600 ohm, 4 KHz voice channel. Consequently, the communication element 26 comprises the voice channel as well as the equipment required to interface the voice channel with the voltage to frequency converter 24 and a frequency to voltage converter 28.

The output of the communication element 26 is coupled to the input of the frequency to voltage converter 28. The frequency to voltage converter 28 receives and demodulates the frequency modulated subcarrier signal from the communication element 26. The output of the frequency to voltage converter 28 is an AC signal comprising the received comparison signal and having a fundamental frequency which is equal to the system frequency, typically 50 or 60 Hz. In the preferred embodiment, the frequency to voltage converter 28 is also a Burr-Brown Type VFC32BM.

Referring now to FIG. 3, the demodulated signal output from the frequency to voltage converter 28 is coupled to the input of a second bandpass filter 32 and a first input of a first two input summing amplifier 34. In the preferred embodiment, the second bandpass filter 32 is a multiple feedback bandpass filter having a bandpass center frequency substantially equal to fundamental frequency of the demodulated signal, typically 50 or 60 Hz, a Q of 1, and a gain of $-1$.

In the preferred embodiment, the first two input summing amplifier 34 is an operational amplifier whose output is equal to the sum of the magnitudes of the two signals coupled to its input. The output of the second bandpass filter 32 is coupled to an operate circuit of the protective relay receiving the comparison signal. The operate circuit utilizes the output signal from the second bandpass filter 32 as an operate signal, in conjunction with a locally generated operate signal, in the generation of relay trip signals.

The output of the second bandpass filter 32 is also coupled to a second input of the first two input summing amplifier 34. The output of the first two input summing amplifier 34 is coupled to a first input of a second two input summing amplifier 36 through a first resistor 38, as well as to the input of a zero suppression network 40 and one contact of a single pole switch 42. The other contact of switch 42, is electrically connected to the first input of the second two input summing amplifier 36 through a second resistor 44. In the preferred embodiment, the second two input summing amplifier 36 is an operational amplifier whose output is equal to the sum of the magnitudes of the two signals coupled to its inputs.

The zero suppression network 40 comprises a circuit that removes the portion of the input signal that is less than a pre-set level. Consequently, the zero suppression network 40 passes only that portion of the input signal which is greater than the pre-set level. In the preferred embodiment, the zero suppression network 40 is of the type shown and described under the heading "DEAD ZONE" on pages 25-26 of a publication entitled "Non Linear Circuits Handbook", edited by Daniel H. Sheingold, published 1974 by Analog Devices, Inc. Norwood, Mass., which publication is incorporated in this detailed description as if fully set forth herein.

The output of the zero suppression network 40 is coupled to the input of an amplifier 46. The output of the amplifier 46 is coupled to the input of a fast rise, slow decay circuit 48. The output of the fast rise, slow decay circuit 48 is coupled to a second input of the second two input summing amplifier 36 through a third resistor 50. In the preferred embodiment, the amplifier 46 is an operational amplifier having a gain of 10. The output of the fast rise, slow delay circuit 48 remains for a period of time after the removal of the input signal, which period of time is determined by the decay time of the circuit.

The output of the second two input summing amplifier 36 is applied to restraint circuits of the protective relay receiving the comparison signal. The restraint circuits utilize the output signal from the second two input putting amplifier 36 as a restraint signal, in conjunction with locally generated restraint signals, to prevent the generation of circuit breaker trip signals.

The apparatus of the present invention operates as follows. A comparison signal is generated by a protective relay at one end of a protected zone, for example relay 12 in FIG. 1. The comparison signal passes through the first bandpass filter 22 which attenuates all frequencies except the fundamental frequency of the comparison signal. This filtered signal is then applied to the input of the voltage to frequency converter 24 which uses the filtered comparison signal to modulate the subcarrier signal.

The carrier frequency of the voice channel communication link is then modulated by the sub carrier signal and transmitted to the receiving relay at the other end of the protected zone, for example relay 14 in FIG. 1. The voice channel carrier frequency is demodulated by the interface equipment of the communication element 26 to provide a modulated sub carrier signal which is applied to the frequency to voltage converter 28. The frequency to voltage converter 28 reproduces the comparison signal by demodulating the sub carrier signal.

In an error-free communication channel, the demodulated subcarrier signal will be a faithful reproduction of the comparison signal generated by the sending protective relay. However, in reality, the demodulated signal is quite likely to be a composite of the original comparison signal and other signals induced by errors in the communication channel. Such errors can be caused by, for example, noise due to faults in the transmission line, signal frequency translation; alien signals; spurious signals; etc. Error-induced signals could be of a magnitude sufficient to cause the generation of a trip signal by the receiving relay when in fact no such signal should have been generated.

It has been found that errors in the communication channel will almost always produce demodulated signals which are not fundamental frequency sinusoidal signals. In accordance with the present invention, the demodulated signal from the frequency to voltage converter 28 is applied both to the input of the second bandpass filter 32 and one input of the first two input summing amplifier 34. The bandpass filter 32 will substantially attenuate all signals caused by errors in the communication channel since it essentially passes only sinusoids of fundamental frequency. In other words, the output of the second bandpass filter 32 is the reconstructed comparison signal essentially without error induced Since the gain of the second bandpass filter 32 is −1, the first two input summing amplifier 34 will actually be subtracting the reconstructed comparison signal, that is the output of the second bandpass filter 32, from the unfiltered demodulated signal. The result of this subtraction is an output signal from the first two input summing amplifier 34 which signal comprises the error-induced components of the demodulated signal. Note that if there are no error-induced components in the demodulated signal, the first two input summing amplifier 34 will be essentially subtracting the sinusoidal comparison signal from itself thereby producing an output having a magnitude substantially equal to zero.

As shown in FIG. 3, assuming switch 42 to be in the closed position, if the output from the first two input summing amplifier 34 is less than the pre-set level of the zero suppression circuit 40, the output of the second two input summing amplifier 36, which is coupled to the relay restraint circuits, will be the output of the first two input summing amplifier 34 coupled to the first input of the second two input summing amplifier 36 via the parallel resistors 38 and 44. Switch 42 is provided to reduce the gain of the first input of the second two input summing amplifier 36 for those applications involving essentially noiseless communication channels, such as dedicated fiber optic channels. Because of the time constant of the second bandpass filter 32, there will be an initial output from the first two input summing amplifier 34 which will appear as a restraint signal at the output of the second two input summing amplifier 36, which is beneficial in stabilizing the tripping comparator on the inception of a fault.

In the case of extremely high levels of noise, such as those produced by arcing disconnect switches, the demodulated signal input to the second bandpass filter 32 and the first two input summing amplifier 34, can be a high energy short duration signal that can cause the bandpass filter 32 to "ring", thereby producing an operate signal output from filter 32 after the noise signal has disappeared. The pre-set level of the zero suppression network 40 is selected to be greater than the normal maximum output of the first two input summing amplifier 34, but less than the level of the high noise signal. Therefore, upon occurrence of such a high noise signal, the zero suppression network 40 will produce an output which is amplified by amplifier 46 and coupled to the second input of the second two input summing amplifier 36 through the fast rise, slow decay circuit 48 and the resistor 50. The gain of amplifier 46 and the decay time of the fast rise, slow decay circuit 48, are selected such that the output from the zero suppression network 40, produced as a result of the high noise signal, will produce a signal at the output of the second two input summing amplifier 36 which is utilized by the receiving relay as a restraint signal, thereby preventing the relay from producing a false trip signal as a result of the occurrence of the high noise signal.

As can be seen from the above detailed description, the apparatus of the present invention will cause a restraint signal to be generated as a result of error induced signals in the communication channel, non-sinusoidal fault currents, or non-fundamental frequency currents, thereby preventing erroneous operation of the protective relay. Furthermore, the apparatus of the present invention enables a substantially error-free received comparison signal to be utilized in the operation of the protective relay. Thus it can be seen that the apparatus of the present invention enhances the reliability and security of protective relay operation in the presence of excessive noise and/or other errors in the communication channel linking the relays in a protective relay system.

While the present invention has been described with reference to a specific embodiment thereof it will be obvious to those skilled in the art that various changes and modifications may be made to the invention without departing from the invention in its various aspects. It is contemplated in the appended claims to cover all variations and modifications of the invention that come within the true spirit and scope of my invention.

I claim:

1. In a protective relay for use in protecting a predetermined protected zone of a three phase alternating current power transmission line, said relay being of the type which receives a comparison signal, having at least a fundamental frequency, from a remote relay and generates a first restraint signal which is related to the difference between the receive comparison signal and a filtered comparison signal having a frequency which substantially comrpises said fundamental frequency only, an improvement comprising means for preventing generation of a relay trip signal upon occurrence of a high level noise signal component in said comparison signal, said means comprising:
   (a) means, adapted to receive said restraint signal, for producing an output signal when the magnitude of said restraint signal exceeds a pre-set level;
   (b) means for amplifying said output signal and producing an amplified output signal;
   (c) means, adapted to receive said amplified output signal, for producing a second rstraint signal which remains for a predetermined period of time after discontinuance of said amplified output signal; and
   (d) means for producing an output restraint signal which is substantially equal to the sum of the magnitudes of the first restraint signal and the second restraint signal.

2. The improvement in accordance with claim 1 wherein said means for producing an output signal when the magnitude of said restraint signal exceeds a pre-set level comprises a zero suppression network.

3. The improvement in accordance with claim 2 wherein said means for producing an output restraint signal comprises an operational amplifier having a first input to which is applied said first restraint signal, and a second input to which is applied a second restraint signal, and an output which is equal to the sum of the magnitudes of the signals applied to said inputs.

* * * * *

UNITED STATES PATENT AND TRADEMARK OFFICE
CERTIFICATE OF CORRECTION

PATENT NO. : 4,751,604

DATED : June 14, 1988

INVENTOR(S) : Stanley B. Wilkinson

It is certified that error appears in the above-identified patent and that said Letters Patent is hereby corrected as shown below:

In Claim 1, at column 7, line 22, "receive" should read --received--.

In Claim 1, at column 7, line 24, "comrpises" should read --comprises--.

In Claim 1, at column 8, line 9, "rstraint" should read --restraint--.

Signed and Sealed this

First Day of November, 1988

Attest:

DONALD J. QUIGG

*Attesting Officer*  *Commissioner of Patents and Trademarks*